Oct. 27, 1970  R. E. BAUER  3,535,949

ANTIBACKLASH GEARING

Filed April 17, 1969

INVENTOR
RUSSELL E. BAUER

BY Hauke, Krass, Gifford, & Patalidis

ATTORNEYS

United States Patent Office 3,535,949
Patented Oct. 27, 1970

3,535,949
ANTIBACKLASH GEARING
Russell E. Bauer, Grosse Pointe, Mich., assignor, by mesne assignments, to KDI-Bauer Corporation, Warren, Mich., a corporation of Delaware
Filed Apr. 17, 1969, Ser. No. 816,905
Int. Cl. F16h 55/18
U.S. Cl. 74—440
8 Claims

ABSTRACT OF THE DISCLOSURE

An antibacklash arrangement for a gear drive having a split gear forming two gear portions having a common axis and angularly positionable one with respect to the other so as to provide a controlled amount of angular separation between the teeth of one gear portion and the teeth of the other gear portion, such that a toothed member meshing with the split gear has both the leading and trailing faces of each of its teeth engaged by both the leading and trailing faces of each tooth of the gear. A spring bias provides the teeth separation in one direction, and wedge means are provided for preventing the controlled amount of separation from being decreased by relative angular motion of the gear portions under the action of reverse loads.

BACKGROUND OF THE INVENTION

Conventional gearing, wherein a gear is adapted to mesh and drive, or be driven by, a toothed member, which may be another gear or a straight toothed member such as a rack, generally exhibits a substantial amount of backlash. Such backlash is often necessary for proper operation of the gearing without binding or undue wear, but it often results from design imperfections and machining variations such as eccentricity, out of roundness, in exact center distances between elements, unequal tooth thickness of a random pattern, etc. Such variations cause a continuously variable backlash which, under certain circumstances, may become a constant backlash after the gearing elements have been operated for a "run-in" period of time. Backlash also results from normal wear associated with normal use of gearing assemblies.

Backlash in gearing assemblies adapted to provide reversible drive presents many inconveniences, the most important of which is lack of positioning accuracy where it is desired to drive a driven member from a predetermined finite position. Because of the presence of backlash in conventional gearing, when a gear driven member is driven in a predetermined direction, its final position corresponding to a predetermined position of the driving member depends upon the direction of torque transmission load and upon the original direction of motion. Consequently, where great precision is required, such as for example in machine tools and the like, heavy weapons traverse mechanisms and the like, etc., displacement and loads must be always directed in the same direction if positioning precision is sought.

In addition, backlash in gearing assemblies creates noise, results in poor efficiency, may lead to vibrations at certain speed and causes hammering loads to be imposed upon the meshed teeth of the assembly components.

Antibacklash gear drive systems have been known for some time, wherein the gear portions of split gears are provided with means for angularly separating the teeth of one of the gear portions relatively to the teeth of the other gear portion, for the purpose of decreasing or suppressing backlash between the driving and driven members. The angular displacement of on gear portion relatively to the other is generally provided by a spring bias, by an adjustable friction coupling as disclosed in U.S. Pat. No. 1,124,107, by means of levers interconnecting the two gear portions as disclosed in U.S. Pat. No. 2,640,428, or by mounting one of the gear portions on a helicoidally splined shaft, such that the axial displacement of one gear portion with respect to the other results in relative angular displacement of the corresponding portions, as disclosed in U.S. Pat. No. 2,896,466.

The present invention is an improvement on the antibacklash gearing disclosed in U.S. Pat. No. 3,405,566, issued Oct. 15, 1968, and assigned to the same assignee as the present application, and providing for a split gear or pinion forming two substantially identical gear portions one of which is supported slidably by a solid shaft disposed within a hollow shaft on which the other gear portion is keyed. One shaft is urged angularly by spring bias in rotation in one direction relatively to the other shaft, and the relative angular rotation of the two shafts in opposite directions is opposed by camming means. Although such an arrangement was found to be generally effective, it necessitates machining in the hollow shaft two oppositely inclined diametrally disposed slots, and the manufacturing of several costly and precision parts resulting in relatively high manufacturing costs. The present invention provides a substantial improvement in the durability and the reduction in maintenance of antibacklash gearing assemblies, and provides a much simplified assembly at a considerable reduction in cost.

SUMMARY OF THE INVENTION

The present invention provides for an antibacklash gearing assembly consisting of a split gear or pinion forming two substantially identical gear portions, one of which is slidably mounted by way of helical splines on the end of a solid shaft disposed within a hollow shaft supporting the other gear portion keyed thereon. The two shafts are prevented from rotating independently from each other, and the solid shaft is urged by spring bias in an axial direction relatively to the hollow shaft, such that the helical spline tends to cause the gear section mounted on the solid shaft to be angularly displaced relatively to the gear section mounted on the hollow shaft such that one gear section or the other constantly meshes with a cooperating toothed member, irrespective of the direction of rotation of the gear assembly.

An antibacklash gearing system, according to the invention, has thus many obvious applications where it is desired to provide a reversible variable load gear drive wherein predetermined motion of the driving members produces a predetermined displacement of the driven member, irrespective of the sense or direction of motion and irrespective of the direction in which loads are being applied to the gearing. Such an anti-backlash arrangement has practical applications in precision instruments, machine tools, in the ordnance art for drives for turret or cupola mounted weapons, etc.

The many advantages of the present invention will become apparent to those skilled in the art when the description of an example of a preferred embodiment thereof is read in conjunction with the accompanying drawings wherein like numerals refer to like parts and in which:

DETAILED DESCRIPTION OF A PREFERRED EMBODIMENT

Figures 1, 2, 3, 4:
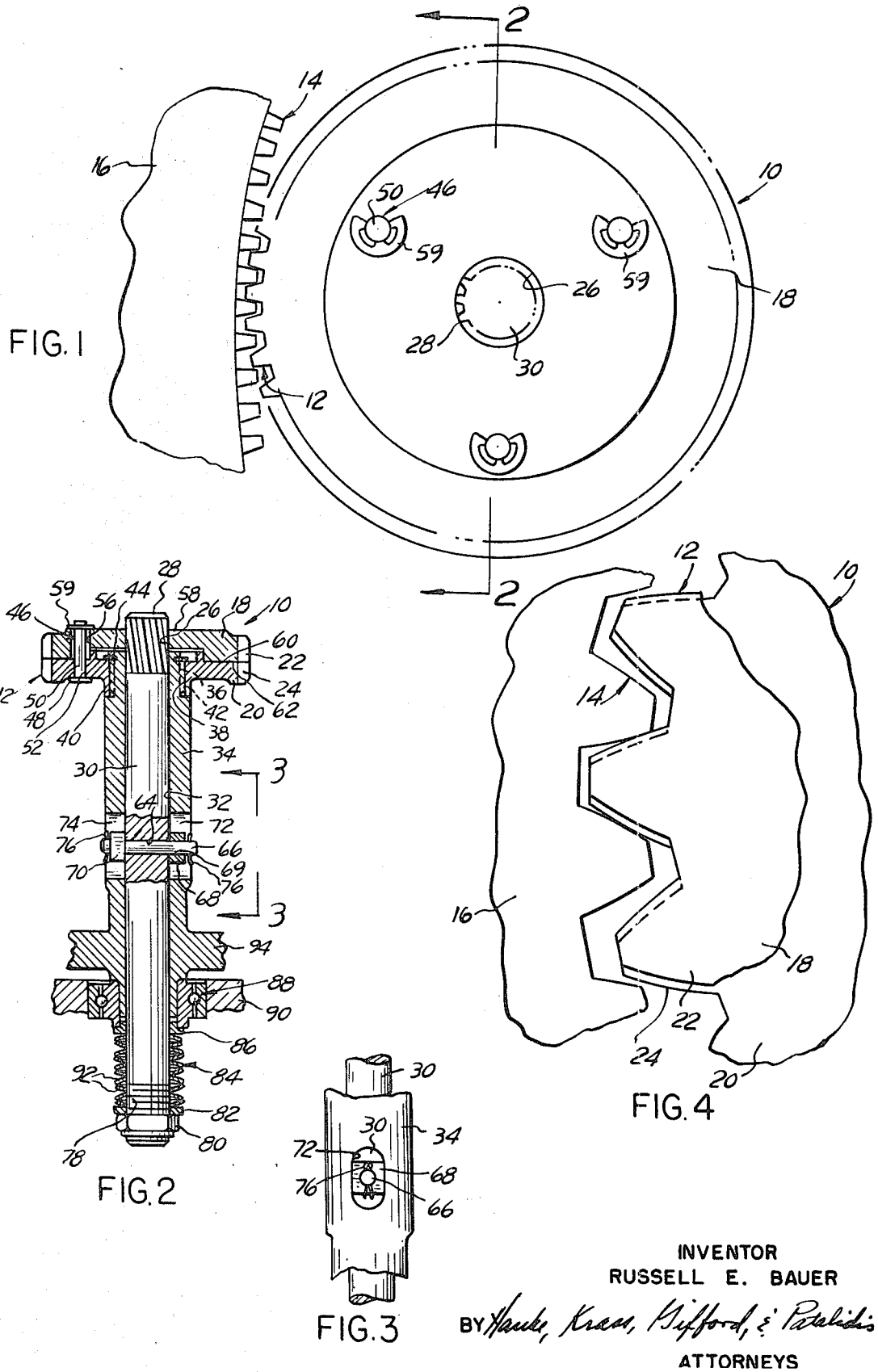
FIG. 1 is a plan view of a gear drive incorporating an example of antibacklash arrangement according to the present invention.
FIG. 2 is a longitudinal sectional view substantially along line 2—2 of FIG. 1.
FIG. 3 is a partial elevational view, from line 3—3 of FIG. 2.
FIG. 4 is a fractional enlarged view of a portion of FIG. 1.

An antibacklash gearing arrangement according to the principles of the present invention is shown in the drawing as consisting of a gear member 10 having spur teeth, generally indicated at 12, adapted to mesh with the spur teeth 14 of a toothed member 16. The toothed member 16 may be any member capable of driving gear member 10 or capable of being driven thereby, and) may consist of another gear or pinion, or a rack, or, as shown, of an annular shaped internal gear. As shown best in FIG. 2, the gear member 10 is split substantially along a plane perpendicular to the axis of rotation thereof, so as to define two gears portions 18 and 18, substantially alike, and coaxially disposed side by side, such that complete spur tooth 12 is defined by each pair of correlated spur tooth portions 22 and 24 depending respectively from the gear portions 18 and 20, a plurality of pairs of correlated spur tooth portions being integrally formed on the periphery of both gear portions.

The gear portion 18 is provided witfh a centrally isposed helically splinder bore 26 through which projects the correspondingly helically splined end 28 of a solid shaft member 30 coaxially disposed within the longitudinal bore 32 of a hollow shaft 34. The hollow shaft 34 is provided with a reduced diameter shouldered outer portion 36 adapted to accept the central bore 38 of the gear portion for rigid mounting of the gear portion 20 thereon by conventional means such as a keyway and key assembly or by means of mating straight splines 40 and 42 as shown, an annular retainer 44 preventing longitudinal axial displacement of the gear portion 20 relatively to the hollow shaft 34.

The gear portion 18 is restrained against axial longitudinal displacement by being freely fastened to the gear portion 20 by means such as pins 46, three in number in the example illustrated and each having a head 48 engaging the outer surface of the gear portion 20 and a cylindrical body 50 disposed without clearance in axial bores 52 circularly disposed in the gear portion 20. Each pin 46 has a portion of its body 50 projecting through each of a plurality of axial bores 56 circularly disposed in the gear portion 18 and aligned one by one with a corresponding axial aperture 52 in the gear portion 20. The end of each pin 46 projecting beyond the outer face 58 of the gear portion 18 is provided with a snap ring 59 engaged with an appropriate annular groove in the end of the pin such that the gear portions 18 and 20 are prevented from being axially movable relatively to each other. The length of each pin body portion 50 between the head 48 and the snap ring 59 is such as to cause sliding engagement of the juxtaposed inner faces 60 of the gear portion 20 and 62 of the gear portion 18, to permit the two gear portions to be relatively displaceable angularly of a limited amount corresponding to the clearance between the inner surface of the bores 56 in the gear portion 18 and the outer surface of the cylindrical body portion 50 of the pins 46, the bores 56 having an inner diameter larger than the outer diameter of the cylindrical body portions 50 of the pins 46.

The concentric shafts 30 and 34 are prevented from angularly rotating one relative to the other, as shown in FIG. 2, as a result of the solid shaft 30 having a diametrically oriented transverse bore 64 in which is disposed a cylindrical pin 66, each end of the pin projecting through a bore 69 in each one of the blocks 68 and 70 disposed in diametrically opposed symmetrical axial slots 72 and 74, formed in the wall of hollow shaft 34. Means such as cotter pins 76 are provided through diametrically disposed apertures proximate the ends of the pin 66 for retaining the pin in position in assembly.

The lower end of the solid shaft 30, as shown in FIG. 2, is provided with a threaded portion 78 adapted to accept a nut 80 having an end face engaging a washer 82 engaging in turn the end of a spring assembly 84. The other end of the spring assembly 84 engages the surface of an annular abutment which may be formed on the lower end of the hollow shaft 34 or, alternately as shown, may be the retaining collar for the inner race of a ball bearing 88, or the like, supporting the hollow shaft 34 for rotation relatively to a housing 90. The spring assembly 84 is thus held in compression, the amount of compression being adjustable by means of the nut 80. In the example shown, the spring assembly 84 consists of a spring pack formed by several symmerically disposed super-imposed annular dished spring members 92, commonly known as Belleville spring washers, disposed in compression between the washer 82 and the surface of the annular abutment 86. In this manner, the amount of spring force exerted by the spring assembly 84 which urges the solid shaft 30 axially and downwardly, as shown, in the drawing, can be manually adjusted by rotation of the nut 80.

The hollow shaft 34 carries a second pinion or toothed wheel, or a pulley, or any other member, as shown at 94, such that rotation of the shaft 34 with respect to appropriate support bearings, as shown at 88, corresponds to an equivalent rotation of the member 94 relatively to the housing 90, and vice-versa, such that the assembly of member 94, shafts 30 and 34 and gear 10 forms a complete elementary unit of a gear train or drive, irrespective of whether the member 94 or the gear 10 is the driving or driven element.

The operation of the antibacklash gearing arrangement of the invention is obvious from the preceding description. As a result of the force exerted by the spring assembly 84, the solid shaft 30 tends to be displaced axially relatively to the hollow shaft 34, but is prevented from being angularly displaced relatively to the hollow shaft in view of the transverse pin 66 having its ends provided with the blocks 68 and 70 engaged in the slots 72 and 74, respectively, through the wall of the hollow shaft 34. In view of the helical splined connection between the end 28 of the solid shaft 30 and the bore 26 of the gear portion 18, the reactive force exerted on the gear portion 18 causes a limited angular motion of the gear portion 18 relatively to the gear portion 20, such that the toothed portions 22 are urged to be angularly displaced relatively to the toothed portions 24 of the gear portion 20. This angular separation of the toothed portions is of course limited, as best shown in FIG. 4, to an amount such that the toothed portions 22 and 24 in each pair are angularly offset of a distance sufficient to fill the inter-tooth space between consecutive teeth 14 of the toothed member 16. Any tendency for the toothed portions 22 and 24 to be forced back into realignment under torque load condition is prevented by the frictional engagement of the side faces of the blocks 68 and 70 with the side surfaces of the slots 72 and 74, thus causing an irreversible action of the backlash takeup mechanism of the invention. This action, favoring angular separation of the toothed portions 22 and 24 in one direction but inhibiting relative motion in an opposite direction, thus continuously provides an automatic backlash takeup corresponding to the amount of clearance between the teeth 14 and the teeth 12 meshing with each other and provides a gear drive system having a controlled amount of separation between the toothed portions 22 and 24 which remains the same irrespective of the direction of drive of the gear train and irrespective of the direction and change of direction of the loads imposed thereon. Furthermore, the force tending to angularly displace the gear portions 18 and 20 relatively to each other, may be adequately tailored to any appropriate amount of preload according to the biasing force of the springs 92 adjustably determined by the nut 80. By utilizing rigid shafting which minimizes torsional displacement the arrangement of the invention provides positive backlash control for high load applications.

Having thus described the antibacklash gearing ar- rangement of the present invention by means of an illustrative example thereof, variations whereof will become apparent to those skilled in the art, what is sought to be protected by United States Letters Patent is as follows:

1. In a gear drive having a gear provided with teeth adapted to mesh with the teeth of a toothed member, an antibacklash improvement comprising:
- said gear being made of two axially aligned gear portions each operatively meshing with said toothed member;
- a hollow shaft member having an end rigidly supporting one of said gear portions for rotation in unison therewith;
- an internal shaft member coaxially disposed in said hollow shaft member and having an end adapted to support the other of said gear portions for rotation in unison therewith by way of an axially slidable helical spline arrangement;
- means for maintaining said gear portions in close juxtaposition whilst permitting limited angular motion therebetween;
- means urging said hollow shaft and said internal shaft in relative axial displacement for angularly relatively urging said gear portions in opposite first directions; and
- means interconnecting said hollow shaft and said internal shaft for preventing relative angular displacement therebetween.

2. The improvement of claim 1 wherein the means urging said hollow shaft and said internal shaft in relative axial displacement comprises:
- a pair of diametrically opposed axial slots in said hollow shaft;
- a bearing block in each of said slots;
- a pin supported at each end in one of said bearing blocks and disposed in a diametrical aperture in said internal shaft; and
- spring means axially biasing said internal shaft relatively to said hollow shaft;
- whereby relative axial displacement of said shafts results in relative angular displacement of said gear portions.

3. The improvement of claim 2 further comprising:
- means for manually adjusting the force exerted by said spring means.

4. The improvement of claim 3 wherein said means for manually adjusting the force exerted by said spring means comprises:
- an externally threaded portion on the other end of said internal shaft; and
- a nut member threadable in said externally threaded portion on the end of said internal shaft and engaging an end of said spring means, said spring means being disposed for compression between said nut and an annular abutment dependent from said hollow shaft.

5. An improved gear member adapted for positive meshing with an appropriate toothed member irrespective of the direction of relative drive of the members, said gear member comprising:
- coaxial shaft members disposed one within the other for relative axial displacement therebetween;
- a pair of coaxial gear portions disposed side by side for simultaneous meshing with said toothed member;
- means fastening said gear portions one to the other for preventing relative axial displacement therebetween whilst permitting limited relative angular displacement;
- means rigidly mounting one of said gear portions on an end of one of said shaft members;
- means mounting the other of said gear portions on an end of the other of said shaft members for rotational connection therewith as a result of said relative axial displacement therebetween;
- means dependent from said shaft members for preventing relative angular displacement of said shaft members; and
- means constantly urging relative axial displacement of said shaft members.

6. The improved gear member of claim 5 wherein the means dependent from said shaft members for preventing relative angular displacement of said shaft members comprises:
- a pair of diametrically opposed longitudinal slots in one of said shaft members disposed surrounding the other;
- a bearing block in each of said slots; and
- a pin supported at each end in one of said bearing blocks and disposed in a diametrical aperture in the other of said shaft member.

7. The improved gear member of claim 5 wherein the means constantly urging relative axial displacement of said shaft members comprises:
- spring means axially biasing one of said shaft members relatively to the other;
- wherein relative axial displacement of said shaft members results in relative angular displacement of said gear portions.

8. The improvement of claim 7 further comprising:
- means for manually adjusting the force exerted by said spring means.

References Cited
UNITED STATES PATENTS 3,407,727   10/1968   Fischer _____ 74—440 X LEONARD H. GERIN, Primary Examiner

KDI-108-A  UNITED STATES PATENT OFFICE
CERTIFICATE OF CORRECTION

Patent No. 3,535,949          Dated October 27, 1970

Inventor(s) Russell E. Bauer

It is certified that error appears in the above-identified patent and that said Letters Patent are hereby corrected as shown below:

IN THE SPECIFICATION

Column 1, line 70, after "of" cancel "on" and insert - - one - -

Column 3, line 9, after "and" cancel the parenthesis (())

line 14, after "and" cancel "18" and insert - - 20 - - line 21, after "provided" correct the spelling of "with"

after "centrally" cancel "is-" and insert - - dis- - - line 22, cancel "splinder" and insert - - splined - -

Column 4, line 10, after "several" correct the spelling of "symmetrically"

SIGNED AND
SEALED
DEC 29 1970

(SEAL)
Attest:

Edward M. Fletcher, Jr.
Attesting Officer

WILLIAM E. SCHUYLER, JR.
Commissioner of Patents

FORM PO-1050 (10-69)